Sept. 9, 1924.
A. E. POLLOCK ET AL
1,507,711
PROCESS OF MAKING PLASTIC ARTICLES
Filed Jan. 23, 1924
*Fig. 1.*
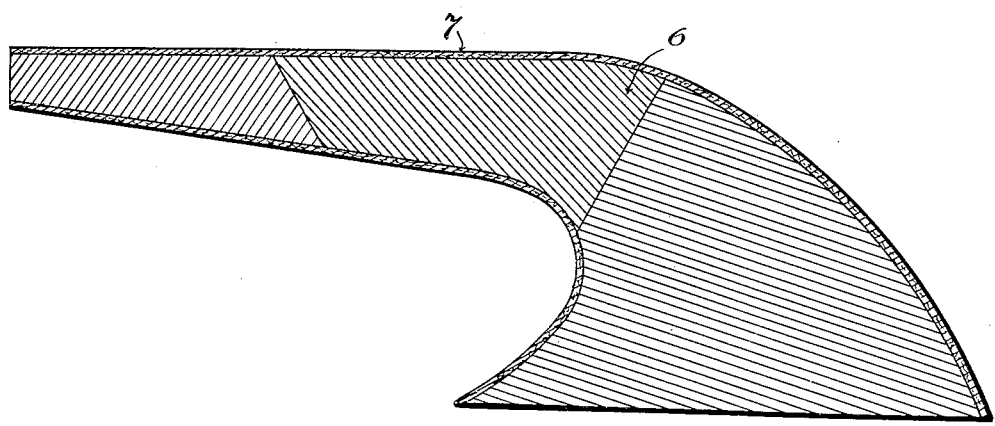
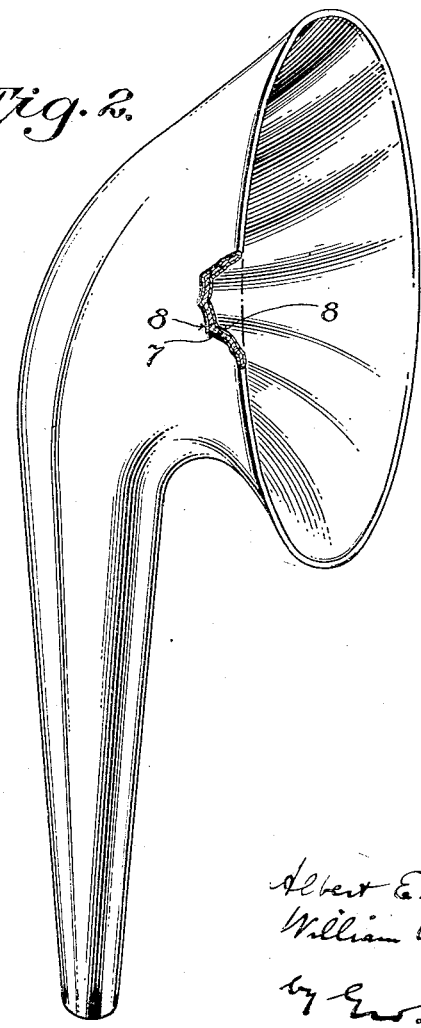
*Fig. 2.*
Inventor
Albert E. Pollock
William P. Horn
by Geo. E. Tew  Attorney Patented Sept. 9, 1924.

1,507,711

UNITED STATES PATENT OFFICE.

ALBERT E. POLLOCK, OF NEW YORK, AND WILLIAM P. HORN, OF MOUNT VERNON, NEW YORK, ASSIGNORS, BY MESNE ASSIGNMENTS, TO INTER-OCEAN RADIO CORPORATION, OF JERSEY CITY, NEW JERSEY, A CORPORATION OF NEW JERSEY.

PROCESS OF MAKING PLASTIC ARTICLES.

Application filed January 23, 1924. Serial No. 687,995.

*To all whom it may concern:*

Be it known that we, ALBERT E. POLLOCK and WILLIAM P. HORN, citizens of the United States, residing at New York city and Mount Vernon, in the counties of New York and Westchester and State of New York, respectively, have invented certain new and useful Improvements in Processes of Making Plastic Articles, of which the following is a specification.

This invention relates to a process for making or molding plastic articles, and is especially applicable to the manufacture of sound horns for radio outfits, talking machines, and the like, altho the process may be applied to the manufacture of other articles.

Ordinarily, plastic products of this kind are made over a mold, by laying wet paper or similar material over the mold, and it is then allowed to dry until the paper or fibre shrinks and becomes a solid mass, the form being then removed from the mold and ground on a grinding machine to remove bumps and roughness before a finish is applied.

The object of the present invention is to simplify and improve the process referred to, by eliminating much of the hand work, and by constructing a horn or the like which will be water proof and heat proof and which is incapable of absorbing water. A further object of the invention is to greatly increase the speed at which such horns or other articles may be made, and at the same time result in a product which will be homogeneous and uniform thru-out.

These and other advantages will be apparent from the following description of the process and the articles produced thereby.

In the accompanying drawings, Fig. 1 is a sectional view illustrating the mold and a horn molded thereon. Fig. 2 is a perspective of the finished horn partly broken away.

In constructing an article according to the process referred to, a mold of aluminum or other material is used as indicated at 6. This mold may be made in sections if necessary to permit it to be "drawn," but the details of its construction are immaterial. Upon this mold is pulled or drawn a sleeve or tubular article of flexible material, indicated at 7. This material is preferably a woven fabric having sufficient stretch or elasticity so that when applied to the mold it will closely conform to and fit the surface thereof. Such a material as jersey cloth, woven felt, or underwear material has been found suitable for the purpose. These sleeves may be woven to a suitable shape, or may be cut from a pattern so that when sewn up will slide over the mold and fit the same perfectly.

The selection and preparation of the material referred to is a matter of considerable importance, and in order to produce a horn of fine quality and full resonance it is necessary that the material be such that it will not absorb water and also that it be free from oil, either of which would make the horn spongy in spots or prevent the thoro impregnation of the material by the hardening substance used. Therefore, we have the material or fabric treated so as to extract all the natural oils therefrom, this treatment being conveniently a chemical one such as by an oil solution which will produce the desired result.

After the sleeve is drawn on the form it is hardened by impregnating the same with glue or paste or other hardening materials, and by reason of the nature and condition of the material used the glue or the like is absorbed to a full extent and impregnates all parts of the material. After being impregnated, the article on the mold is placed in an oven to hasten the drying at the end of which the sleeve becomes a hard and solid article, self-sustaining, and requiring but a small amount of hand work to finish the same. The surface is comparatively smooth and in good condition to take a finish.

Some articles may be built up of several sleeves, in order to produce additional thickness, one sleeve being impregnated and dried before the other is placed thereon and treated in a similar manner.

After being dried, the horn is trimmed while on the mold and the mold may then be removed from the inside and is ready for the finish.

The finish may be of any color desired, and is preferably a coating of water proof material, indicated at 8, and may be applied by dipping the article in a bath of the material, or it may be painted on. We have found that the best results have been obtained by using a solution of cellulose material having the character of an enamel or lacquer, which is hard and water proof and which will give, or is capable of receiving, a high finish.

A horn or other article so constructed will be hard and resonant, and very effective for sound reproduction, especially as it will be free from all soft or spongy spots. The fabric being fully impregnated with the hardening substance, and being coated with an enamel or finish as described, will not absorb moisture and therefore will indefinitely retain its rigidity and its resonant quality. Speed in manufacture is obtained because of the fact that the material does not have to be built up or assembled piece by piece on a form, as in the old papier mâché processes, but can be drawn on the form complete in one operation and the hardening material immediately applied and absorbed, and after a few hours of drying is ready for the finish.

We claim:

1. The process of making molded horns, comprising placing a plurality of sleeves, one upon the other, on a form having the shape of the horn, each of said sleeves being made of a single piece of elastic absorbent fabric and being distended under tension upon the form, and impregnating each sleeve with hardening material after it is placed on the form and before the next sleeve is placed thereon, and then drying the sleeves.

2. The process of making molded horns, comprising placing in succession a plurality of sleeves, one upon the other, on a form having the shape of the horn, each of said sleeves being made of elastic absorbent fabric and being distended under tension upon the form, and impregnating each sleeve with hardening material before the next sleeve is placed thereon, and then drying the sleeves.

In testimony whereof, we affix our signatures in presence of two witnesses.

ALBERT E. POLLOCK.
WILLIAM P. HORN.

Witnesses:
M. J. CARROLL,
N. M. PEPPER.